June 13, 1967                R. E. NOAKES                3,325,187
                         TOW HITCH CONSTRUCTION
Filed Aug. 6, 1965                                      2 Sheets-Sheet 1

Roy E. Noakes, Deceased
By Mary Noakes, Temporary
Administratrix
                    INVENTOR.

BY *Clarence A. O'Brien*
and *Harvey B. Jackson*
                    Attorneys

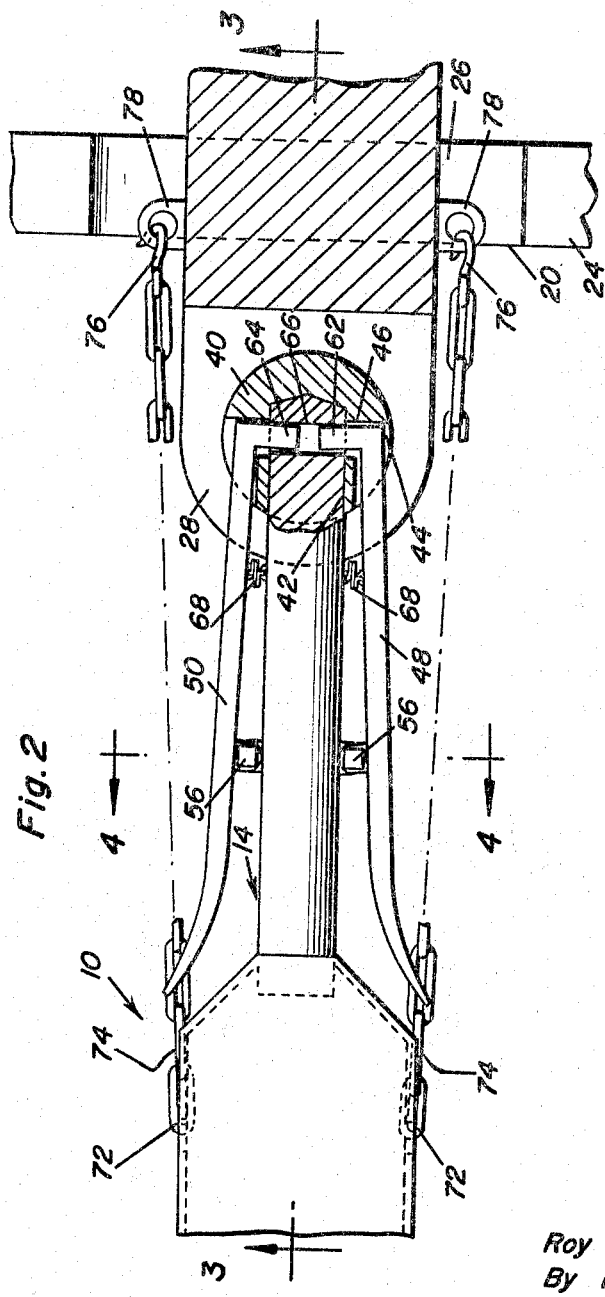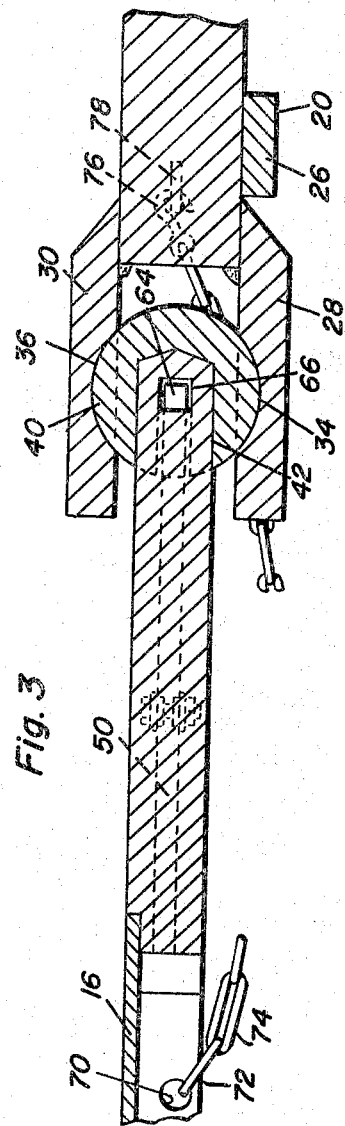

United States Patent Office 3,325,187
Patented June 13, 1967

3,325,187
TOW HITCH CONSTRUCTION
Roy E. Noakes, deceased, late of 901 W. Spring St., Weatherford, Tex. 76086, by Mary Noakes, temporary administratrix, Weatherford, Tex.
Filed Aug. 6, 1965, Ser. No. 478,532
6 Claims. (Cl. 280—493)

ABSTRACT OF THE DISCLOSURE

An articulated connection between a towing vehicle and a vehicle to be towed including means defining opposing partial spherical indentations carried by the towing vehicle, a ball member captively and swively supported in said indentations and an elongated member carried by the forward end of the vehicle to be towed having a free end portion releasably secured in a generally radial bore formed in the ball member.

---

This invention relates to a novel and useful tow hitch construction and more specifically to a hitch assembly constructed in a manner whereby the vehicle to be towed may be readily operatively connected to the towing vehicle and disconnected from the latter with a minimum amount of effort.

The improved tow hitch construction of the instant invention includes support means adapted to be secured to the towing vehicle and defining a rearwardly opening recess in which an anchor member is captively and swivelly supported. The anchor member has a cavity formed therein opening outwardly of at least one side thereof and registerable with the opening of the rearwardly opening recess defined by a support means. An elongated tow member is carried by the vehicle to be towed and a free end portion of the tow member is snugly receivable in the cavity formed in the anchor member and swivable with the later a limited amount in the opening of the recess formed in the support means. After the free end of the tow member has been received within the cavity formed in the swivelly supported anchor member, latch means is utilized to releasably interconnect the tow member and the anchor member preventing withdrawal of the tow member from the cavity formed in the anchor member.

The main object of this invention is to provide an improved tow hitch construction including structural features which enable a towing vehicle to have a vehicle which is to be towed quickly and operatively connected thereto.

Still another object of this invention is to provide an improved tow hitch construction including structural features which readily adapt themselves to being constructed of different sizes so as to be suited for lightweight trailing and well as heavy-duty trailing.

A final object of this invention to be specifically enumerated herein is to provide a tow hitch construction in accordance with the preceding object and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a top plan view of the assembly illustrated in FIGURE 1 of the drawings and with portions of the tow hitch being broken away and shown in horizontal section;

FIGURE 3 is a longitudinal vertical sectional view taken substantially upon the plane indicated by section line 3—3 of FIGURE 2.

Figure 4:
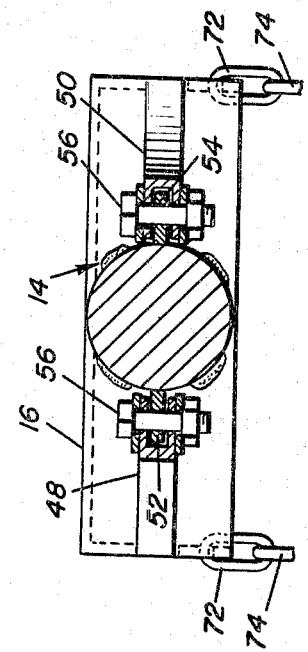
FIGURE 4 is a transverse vertical sectional view taken substantially upon the plane indicated by section line 4—4 of FIGURE 2.
Figure 1:
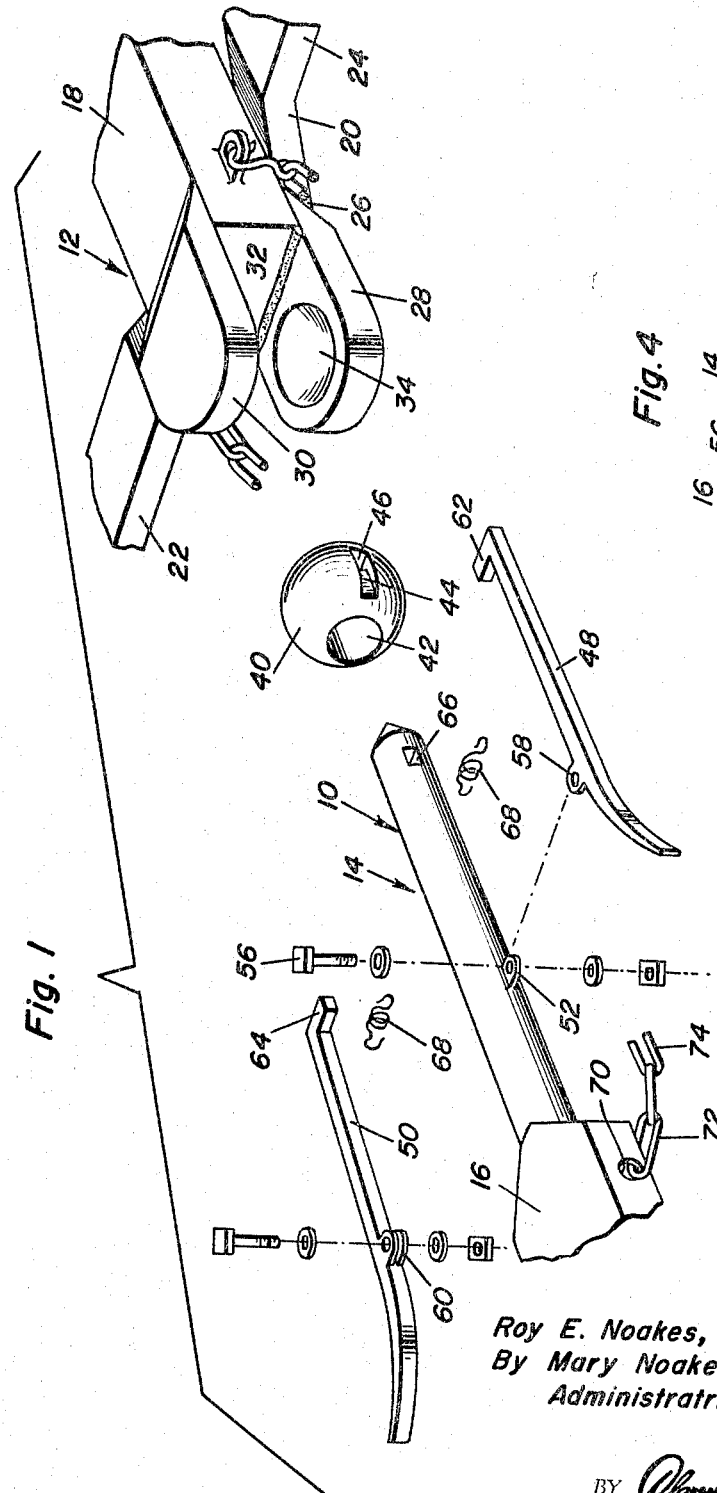
FIGURE 1 is a fragmentary exploded perspective view of the tow hitch construction of the instant invention.

Referring now more specifically to the drawings, the numeral 10 generally designates the tow hitch construction of the instant invention. The tow hitch construction 10 includes a first section 12 which is adapted to be secured to a towing vehicle and a second section generally referred to by the reference numeral 14 which is secured to the forward end of the tongue portion 16 of the vehicle which is to be towed.

The first section 12 includes support means in the form of an elongated draw bar member 18 secured at its forward end (not shown) in any convenient manner to a towing vehicle (not shown) and braced relative to the towing vehicle at its rear end by means of a transverse brace 20. The opposite end portions 22 and 24 of the transverse brace 20 are secured to the towing vehicle in any convenient manner and the rear end of the draw bar 18 is secured to the mid-portion 26 of the brace 20 in any convenient manner such as by welding.

The draw bar or support means 18 includes a pair of rearwardly projecting and vertically spaced flange portions 28 and 30 defining a horizontally disposed and rearwardly opening notch or recess 32. The flange portions 28 and 30 include vertically spaced and confronting partial spherical indentations or cavities 34 and 36 and a generally spherical member 40 is captively and swivelly received in the generally spherical recess defined by the indentations or cavities 34 and 36.

The spherical member 40 is provided with a generally diametric blind bore 42 and a pair of opposite side generally parallel and outwardly opening grooves 44 including one pair of corresponding ends which terminate in transverse passages 46 extending generally radially of the spherical member 40 and opening into the inner end of the bore 42.

A pair of arm members 48 and 50 are pivotally supported from apertured support lugs 52 and 54 on opposite sides of the second section 14 by means of suitable pivot fasteners 56 secured through the lugs 52 and 54 and the corresponding lugs 58 and 60 carried by the arms 48 and 50, respectively.

The forward ends of the arms 48 and 50 are receivable in the grooves 44 and terminate in inwardly directed elongated latch members 62 and 64 receivable in the corresponding transverse passages 46. In addition, it may be seen that the forward end of the second section 14 includes a transverse passage 66 which is registered with the transverse passages 46 and whose opposite ends receive the end portions of the elongated latch members 62 and 64. A pair of expansion springs 68 are secured between the second section 14 and the arms 48 and 50 and yieldingly urge the forward ends of the arms 48 and 50 toward each other so as to maintain the latch members 62 and 64 within the passages 46 and 56.

The opposite side portions of the forward end of the tow bar 16 are apertured as at 70 and the end links 72 of a pair of link chain sections 74 are passed through the apertures 70 and the remote ends of the chain section 74 are provided with hooks 76 releasably engageable with eye-lugs 78 carried by the opposite sides of the rear end of the draw bar member 18.

In operation, when it is desired to disengage the second section from the first section it is merely necessary to inwardly deflect the rear ends of the arms 48 and 50 whereby the elongated latch members 62 and 64 will be withdrawn from the opposite ends of the passage 66 thereby enabling the second section 14 to be withdrawn from the blind bore 42. Of course, when it is desired to couple the first and second sections together, the procedure is reversed. Still further, should it be desired, the blind bore 42 could be tapered with the forward end portion of the second section 14 having a similar configuration. In addition, the opposite ends of the passage 66 could be conical and the transverse passages 46 could be similarly formed so as to form continuations of the opposite ends of the passage 66. Then, the elongated latch members 62 and 64 could also be generally conical in configuration so as to insure that substantially all of the lost motion between the second section 14 and the draw bar member 18 will be eliminated except for the clearance between the spherical member 40 and the indentations 34 and 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tow hitch construction including support means adapted to be secured to a towing vehicle and defining a rearwardly opening recess in which an anchor member is captively and swivelly supported, said anchor member having a cavity formed therein opening outwardly of at least one side thereof and registrable with the opening of said recess, an elongated tow member adapted at one end to be secured to a vehicle to be towed, the other end of said tow member being snugly receivable in said cavity and swivable with said anchor member a limited amount in the opening of said recess, and means releasably interconnecting said tow member and said anchor member preventing withdrawal of said tow member from said cavity, said support means including vertically spaced portions defining partial spherical indentations opening toward each other and into said recess, said anchor member comprising a generally spherical member swivably and captively disposed in said indentations, said spherical member defining at least one generally radially extending passage disposed generally normal to and opening radially into said cavity, said other end of said tow member defining a laterally outwardly opening passage registerable with said radially extending passage, said means releasably interconnecting said tow member and said anchor member comprising an elongated latch member including longitudinally spaced portions disposed in said passages.

2. The combination of claim 6 wherein said cavity comprises an elongated bore formed in said anchor member.

3. The combination of claim 2 wherein said bore is cylindrical and said portion defines a cylindrical end portion.

4. The combination of claim 3 wherein said bore is a blind bore including an inner end wall engageable by the free end of said cylindrical end portion to limit penetration of said cylindrical end portion into said anchor member.

5. The combination of claim 1 wherein said latch member is carried by and comprises a laterally directed portion of an arm member generally paralleling and pivotally secured to said tow member remote from said other end thereof for rotation about an axis extending transversely of said tow member.

6. A swivel connection assembly comprising support means adapted to be supported from a first member, an anchor member swivelly supported from said support means, said anchor member having a cavity formed therein opening outwardly of at least one side thereof, a second member including a portion snugly receivable in said cavity and swivable with said anchor member, means releasably interconnecting said portion and said anchor member preventing withdrawal of said portion from said cavity, said anchor member defining at least one passage opening into said cavity and angulated relative to the center axis thereof extending from the open end thereof to the remote end thereof, said portion defining a laterally outwardly opening passage whose outer end is registrable with the inner end of the first mentioned passage when said portion is snugly received in said cavity, said means releasably interconnecting said portion and said anchor member comprising an elongated latch member including longitudinally spaced portions disposed in said passages.

References Cited
UNITED STATES PATENTS

| 1,218,631 | 3/1917 | De Monts. | |
| 1,327,265 | 1/1920 | Booth | 280—511 X |
| 1,576,967 | 3/1926 | Gould | 280—493 X |
| 2,189,667 | 2/1940 | Kries | 280—493 |

FOREIGN PATENTS 668,250   3/1952   Great Britain.

LEO FRIAGLIA, *Primary Examiner.*